United States Patent

[11] 3,549,886

| [72] | Inventor | Edwin H. Hilborn<br>Framingham, Mass. (32 Annese Road<br>Chelsea, Mass. 02150) |
|---|---|---|
| [21] | Appl. No. | 719,868 |
| [22] | Filed | Apr. 9, 1968 |
| [45] | Patented | Dec. 22, 1970 |

[54] METHOD AND APPARATUS FOR CONVERTING MONOCHROMATIC IMAGERY INTO DIFFERENTIAL COLOR ON A LUMINESCENT SCREEN
13 Claims, 7 Drawing Figs.

| [52] | U.S. Cl. | 250/71, 250/80 |
|---|---|---|
| [51] | Int. Cl. | H01j 1/62 |
| [50] | Field of Search | 250/71, 80 |

[56] References Cited
UNITED STATES PATENTS

| 2,817,767 | 12/1957 | Rosenthal | 250/71 |
| 2,921,201 | 1/1960 | Lieb | 250/71 |
| 3,174,857 | 3/1965 | Clarke | 250/71X |
| 2,603,757 | 7/1952 | Sheldon | 250/80X |
| 2,651,584 | 9/1953 | Longini et al. | 250/80X |
| 3,205,071 | 9/1965 | Finnis | 250/80X |

*Primary Examiner*—Archie R. Borchelt
*Attorneys*—John R. Manning, Herbert E. Farmer and Garland T. McCoy

ABSTRACT: A luminescent screen composition for converting brightness differences in photographic imagery into hue differences is disclosed, comprising a plurality of phosphors having different spectral emissions, wherein at least one of the phosphors has a nonlinear response curve. By increasing the level of ultraviolet excitation to a point above the saturation of one of the phosphors, which emits a selected color, the remaining phosphor or phosphors will predominate to produce their respective color emissions.

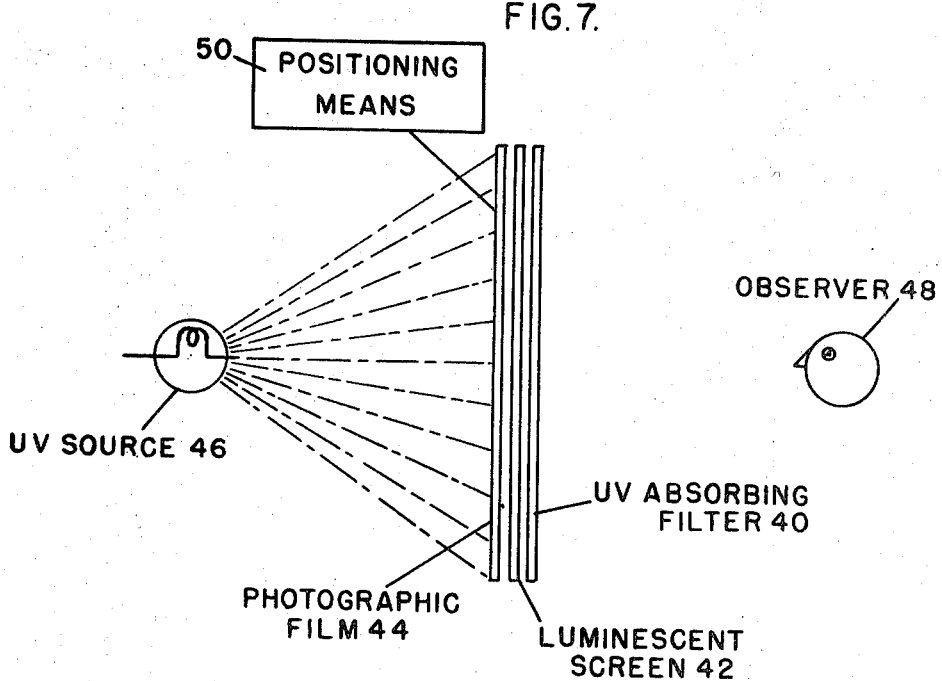

METHOD AND APPARATUS FOR CONVERTING MONOCHROMATIC IMAGERY INTO DIFFERENTIAL COLOR ON A LUMINESCENT SCREEN

ORIGIN OF THE INVENTION

The invention described herein was made by an employee of the U.S. Government and may be manufactured and used by or for the Government of the United States of America for governmental purposes without the payment of any royalties thereon or therefor.

BACKGROUND OF THE INVENTION

Before proceeding with the disclosure of the invention, it would be well to consider the background of the invention. It has been determined that over the photographic density range available with the usual monochromatic photograph, it is possible for the observer to differentiate a maximum of only about 40 brightness levels. On the other hand, when viewing a colored image, it is possible for an observer with average color vision to discriminate approximately 200 separate hues at a constant brightness level. It is therefore self-evident that a larger number of hues in color imagery than of monochromatic (black and white) brightness differences can be utilized during the process of photographic interpretation.

Though various systems have been utilized for conversion of monochromatic imagery (black and white) into a hue scale (color), no simple means presently exists. It is possible, for example, to generate on wash-off photographic emulsions, a positive and a negative from a photographic transparency; to dye these complementary colors; and, to superimpose them for viewing. It is also possible, using a computer, to digitize the gray scale values of discrete points in a photograph and to print these out in different hues. Both of these methods require extra processes and equipment and are not amenable to low cost or routine brightness to hue conversion.

OBJECTS AND SUMMARY OF THE INVENTION

Accordingly, it is an object of the present invention to simplify the means and methods for monochromatic to hue conversions.

It is a further object of the present invention to improve methods for generating variable polychromatic luminescent images from monochromatic brightness images.

It is a further object of the present invention to provide a means for employing ultraviolet radiation to generate polychromatic images from black and white images.

It is a further object of the present invention to provide a method, composition, and means in photographic imagery for deriving hue imagery from monochromatic imagery which is economical, rapid, and which reproduces in the hue imagery, the original scene with greater discriminability.

CONCEPTS ATTENDANT THE INVENTION

This invention relates in general to unique methods for producing variable polychromatic luminescent images, and to improved luminescent screens and devices based thereon. More particularly, the invention involves the provision of a special combination of a plurality of luminescent materials capable of emitting specific colors upon excitation and specifically designed to transform a range of excitation intensities into a range of different hues, the chromatic values of which may include certain basic reference colors representing some predetermined excitation values. Specifically, the invention finds particular application to the production of polychromatic images from signal energy derived through use of normal monochromatic imagery.

BRIEF DESCRIPTION OF THE DRAWINGS

The aforementioned objects and other objects of the invention will become more apparent by reference to the following description and the accompanying drawings in which.

Figure 1:
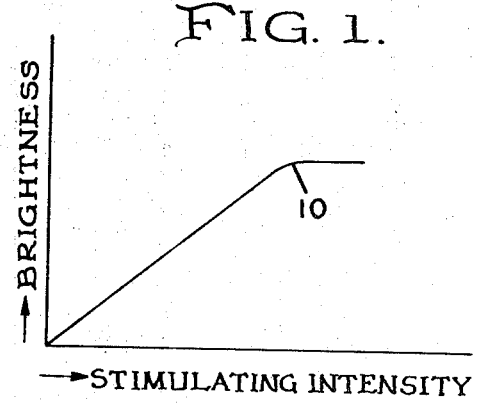
FIG. 1 illustrates that for a linear phosphor there is a linear relationship between ultraviolet stimulating intensity and brightness.
Figure 2:
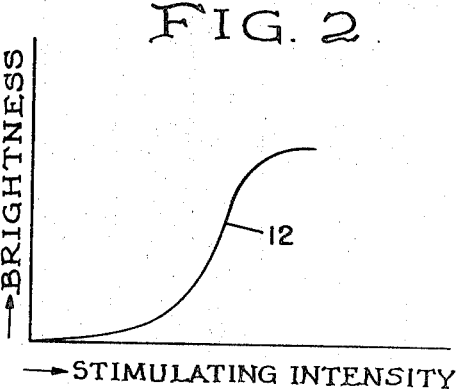
FIG. 2 shows that for a phosphor which has been poisoned there is no longer an ultraviolet intensity vs. brightness linear relationship.

For producing variable polychromatic luminescent images, and to improve luminescent screen and devices based thereon, mixtures of nonlinear phosphors and linear phosphors may be employed. The brightness of a normal phosphor varies approximately linearly with the intensity of ultraviolet stimulation up to the phosphor saturation value, as is indicated on a curve at 10 in the FIG. 1. As is known, poisoning of certain phosphors, such as with nickel or iron, produces a nonlinear relationship between excitation intensity and brightness as illustrated on a curve 12 in the FIG. 2.

Figure 3:
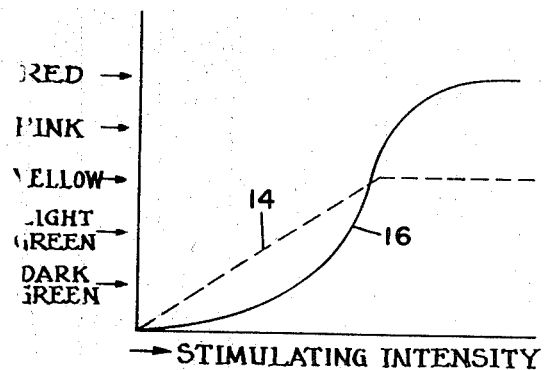
FIG. 3 discloses a combination of a linear phosphor illustrated in the FIG. 1 and a nonlinear phosphor illustrated in FIG. 2.

It has been discovered that by mixing in suitable proportions of phosphors having different spectral emittances and with different curve shapes, different hues may be obtained by variation in the level of excitation by ultraviolet energy. It is thus possible to produce a phosphor screen which emits different colors as a function of the level of ultraviolet irradiation. Illustrative combination of phosphors of the inventive concept can be seen in the FIG. 3. Here, the green emitting phosphor is shown by a dotted line 14, and the red phosphor, which has been poisoned to yield a nonlinear brightness-excitation level relationship, by a solid line 16.

The present invention finds its greatest use in conjunction with the conversion of X-ray transparencies to a hue scale. Other uses would be other types of photointerpretation, that is, wherever a photographic transparency may be interposed between an ultraviolet source and the phosphor screen, thereby permitting direct conversion of the photographic density scale into a hue scale and with increased discriminability. This would allow military photointerpreters to detect subtle differences in imagery which might be difficult or impossible to detect on the original transparency.

Figure 4:
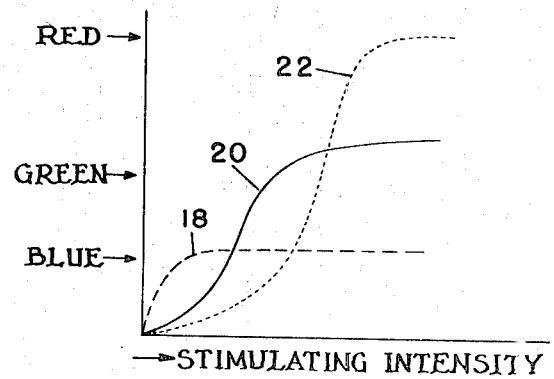
FIG. 4 illustrates a combination of three phosphors having different ultraviolet stimulating intensity vs. brightness characteristics.

It is also possible to use a three primary system in order to obtain a more extended hue scale. By using three phosphors somewhat greater hue-scale length may be obtained, as can be seen in the FIG. 4, where a dashed line 18 represents a blue phosphor response, a solid line 20 a green phosphor response and a dotted line 22 a red phosphor response.

While the screens of the present invention are particularly useful with a single source of ultraviolet energy, this is not to say that such a screen would not be applicable to a plurality of ultraviolet sources projecting an image onto a single screen to give a three dimensional image in various hues, provided that the black and white transparencies have been made for three dimensional projection.

DETAILED DESCRIPTION OF THE INVENTION

More specifically, it is possible to achieve the desired color effects with a number of standard phosphor combinations. As is known, many parameters affect the conversion efficiency of a phosphor. The brightness and color of phosphors depends not only on the specific crystal structure of the chemical compound used, but also on the chemical element or elements used as activator and its (their) percentage in the composition, as well as the chemical elements present as contaminants and their percentage in the composition. The brightness and color of phosphors also depends, among other things, on the firing temperature, length of firing, rate of cooling after firing, particle size, amount and type of grinding, thickness of the coating, temperature of the coating at time of activation, type and amount of binder present in the coating, rate of phosphorescent decay, type or decay ($e^{-nt}$ of $t^{-n}$), and the means for phosphor stimulation.

Figure 5:
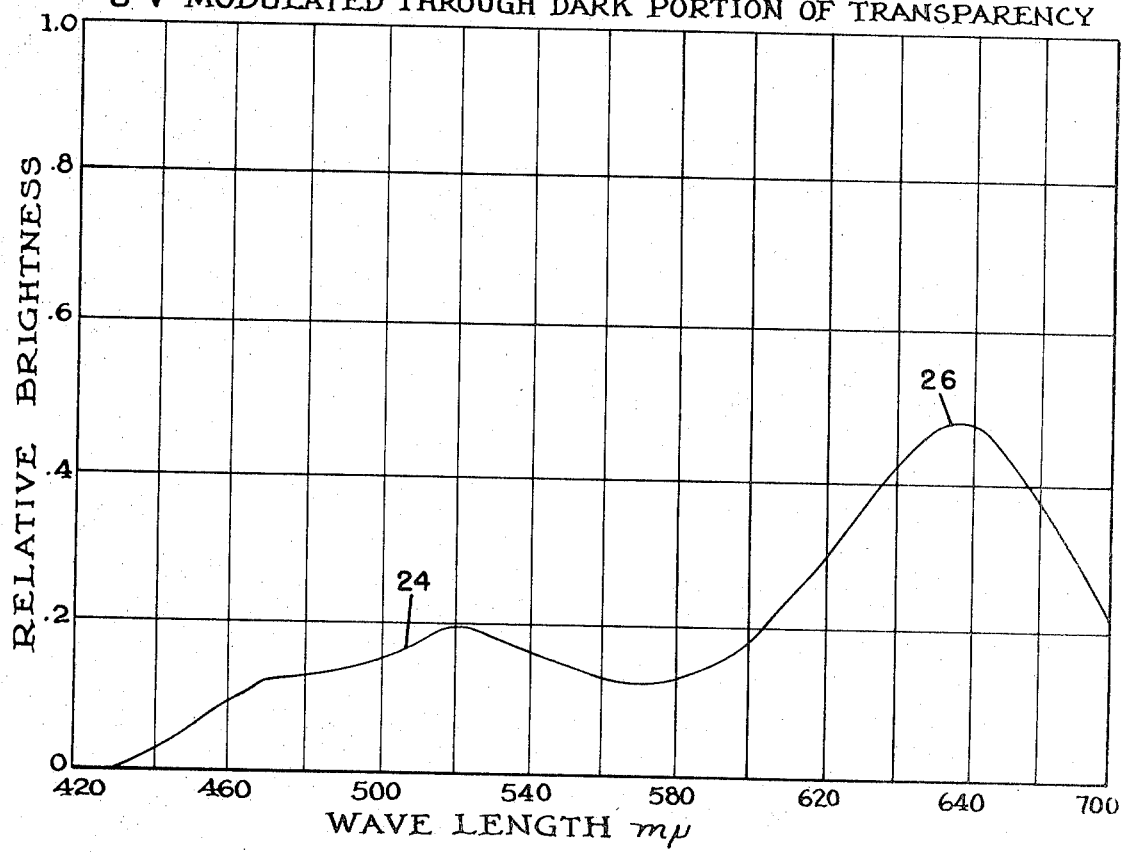
FIGS. 5 and 6 illustrate spectral hue changes obtained which occur when the intensity of the ultraviolet source is varied over a range; and, FIG. 7 illustrates a device for viewing photographic transparencies wherein a photographic film, a luminescent screen of the invention, and a filter are positioned between a source of ultraviolet radiation and an observer.
Figure 6:
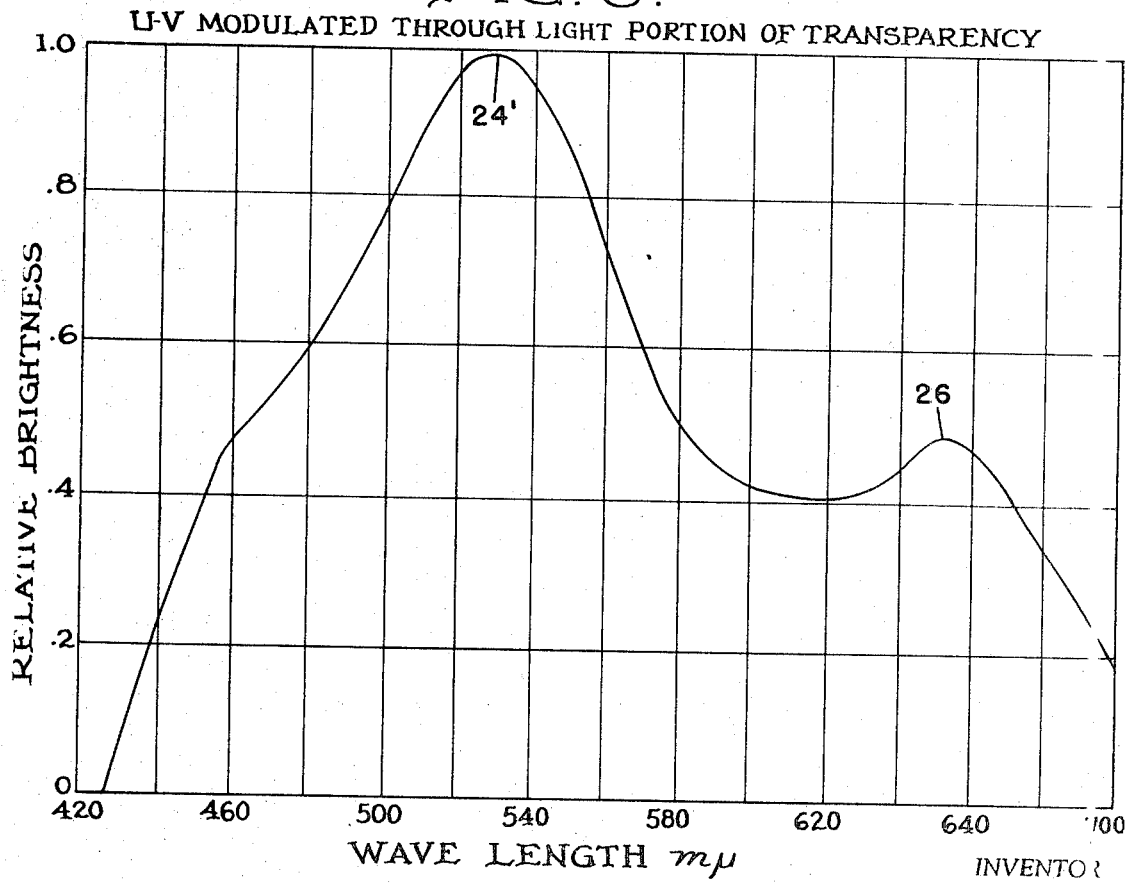

Attention is directed to the following two tables which set forth some of the applicable phosphors by decay type. In carrying out the invention for a two color system, one phosphor may be selected from the first table and a second phosphor from the second table. However, one or more of the phosphors must be contaminated to reduce its (their) response at low levels of ultraviolet stimulation, i.e., to show a nonlinear characteristic, or other means employed to attain nonlinear stimulus-brightness relationships. In making a selection from the tables, it is suggested that the mixture not only consist of a phosphor from each of the two decay types, but also of relatively complementary colors, e.g. Rhbdl $Al_2 O_3$ : Cr (0.5), a red phosphor, with Hex Zns : Cu (0.01), a green phosphor. In this combination, by manipulating the green phosphor to make it nonlinear in response, and by limiting the amount of activator for the red phosphor, so that it saturates at moderate levels of ultraviolet excitation, the green predominates at high intensities of excitation and the red at moderate intensities.

of ultraviolet energy impinge thereon. For instance, a black and white transparency is interposed between the source and the screen. The various gradations of the transparency act to modulate the degree of transmission of the ultraviolet energy thereby controlling the amount of ultraviolet energy finally impinging on the screen. By employing the specific phosphor composition mentioned in the above, those portions of the screen receiving relatively low intensity stimulation will emit red as a predominating hue. In the FIG. 5, it can be seen that there is relatively little green component at 24 and considerable red component at 26, as evidenced by the peak in the 640 millimicron range. When those portions of the screen receive, say, ten times the ultraviolet radiation, the red phosphor saturates while the green component increases, as is evidenced in the FIG. 6 where there is now a peak in the 520—560 millimicron range at 24' overpowering the 640 millimicron peak at 26. Those areas of the screen being exposed by an in-between gradient will emit an amber hue.

As previously set forth, by incorporating a hue scale to an X-ray transparency, the radiologist viewing the resultant is able to obtain improved diagnosis of the images being viewed.

The FIG. 7 illustrates a practical employment of the luminescent screen of the invention in a device for viewing photographic transparencies. As shown, an ultraviolet source 46 is energized so as to direct its illumination toward a photographic film 44. A positioning means 50, of conventional design, is employed to move the photographic film or transparency 44 into and out of position. Adjacent to and substan-

TABLE I

| Structure | Activator | Emission color | U.V. sensitive 2,537 A. | 3,650 A. |
|---|---|---|---|---|
| Hex Zn O | Zn | U.V. plus blue green | X | X |
| Tetra CaWO₄ | W, Pb (1) | U.V. plus violet | X | |
| MonoCl Mg₂WO₅ | W | Pale blue | X | |
| Cub plus Hex ZnS | Mn (2) | Orange | X | X |
| Rhbdl Al₂O₃ | Cr (0.5) | Red | X | X |
| Cub Zn Al₂O₄ | Mn (0.1-2) | Green | X | |
| Rbhdl Be₂ SiO₄ | Mn (0.1-10) | Green to orange-red | X | |
| Rbhdl Zn₂ SiO₄ | Mn (0.1-10) | do | X | |
| Tricl Zn₃ B₄O₉ | Mn (1) | Green-yellow | X | |
| Rhomb Cd SiO₃ | Mn (1) | Orange | X | |
| Monocl Mg SiO₃ | Mn (1) | Red plus IR | X | |
| Rhomb Cd SO₄ | Mn (1) | Yellow-orange | X | |

NOTE.—The above are $e^{-at}$ phosphors, showing decreasing E. The quantities in parentheses are parts by weight to one part of the phosphor.

TABLE II

| Structure | Activator | Emission color | U.V. sensitive 2,537 A. | 3,650 A. |
|---|---|---|---|---|
| Hex CdS | Cd, Ag (0.01) or Cu (0.01) | Red plus IR | X | X |
| Cub ZnSe | Zn, Ag (0.01) or Cu (0.01) | Orange | X | X |
| Cub ZnS | Am, Ag (0.01) | Blue | X | X |
| Hex ZnS | Cu (0.01) | Green | X | X |
| Tetra ZnF₂ | Cb (0.3) | Blue | | |
| Ca₂P₂O₇ | Dy (0.05) | White | | |
| Cub SrS | Bi (0.01) | Blue-green | WK | X |
| Cub CaS | Bi (0.01) | Violet | WK | X |
| Cub SrS | Eu (0.03) plus Sm (0.01) | | WK | X |

NOTE.—The above are $T^{-n}$ phosphors showing increasing E. The quantities in parentheses are parts by weight to one part of the phosphor.

To illustrate a specific embodiment of the present invention, a phosphor screen is composed of two parts of aluminum oxide, a red producing linear phosphor activated with chromium; and one part of zinc sulfide, a green producing phosphor activated with copper and poisoned with nickel to produce a nonlinear output as a function of the beam.

The phosphor mixture is applied to a transparent substrate employing conventional settling and decanting techniques.

The screen having the aforementioned phosphor composition coating is suitably mounted so that the rays from a source tially parallel with the photographic film 44 is a luminescent screen 42. The screen 42 comprises, according to the teaching of the invention, a mixture of phosphors which emit different hues as a function of the amount of ultraviolet energy incident thereon. The amount of energy falling upon the screen 42 will be determined by the optical density of the photographic film 44. An ultraviolet absorbing filter 40 is positioned substantially parallel to the screen 42 and facing an observer 48. During viewing, the filter 40, the screen 42 and the film 44 are in juxtaposition; however, the film 44 is movable by the positioning means 50, with respect to the screen 42. In this manner, the positioning means 50 may alternately position and remove a photographic film 44 according to the film to be viewed. In effect, the film 44 (or transparency) modulates the amount of ultraviolet energy to the screen 42.

It will be apparent that the device of the FIG. 7, employing the luminescent screen of the invention, provides a means whereby photographic transparencies may be viewed. The appearance upon the screen of the scene recorded on the transparency, will be viewed in different hues, the hue being a function of the modulation or the amount of ultraviolet energy which the transparency of the film passes.

It will be apparent that many modifications of the several features described herein may be made without departing from the spirit and scope of the invention. It is therefore apparent that the foregoing description is by way of illustration of the invention rather than limitation of the invention.

I claim:

1. A luminescent screen composition comprising a plurality of phosphors which emit different hues under the influence of ultraviolet radiation and wherein at least one of said phosphors possesses nonlinear phosphor excitation-brightness characteristics such that a change of emission hue results from a change in the amount of ultraviolet radiation incident upon the screen.

2. The composition of claim 1 wherein the phosphors are in admixture.

3. The composition of claim 1 wherein one phosphor is an aluminum oxide phosphor and the nonlinear phosphor is zinc sulfide.

4. The composition of claim 3 wherein one to four parts by weight of aluminum oxide is present to approximately one part zinc sulfide.

5. The method of obtaining selective spectral emission from a luminescent screen comprising:
    a. applying ultraviolet radiation to a luminescent screen wherein said screen contains in admixture a plurality of phosphors, at least one of which has a nonlinear relationship between stimulating intensity and output brightness; and
    b. modulating the energy of the ultraviolet light from that of step (a) by interposing a photographically produced means having light and dark areas to control the modulation.

6. The method of claim 5 in the step of modulating the energy by interposing a photographically produced means, said photographically produced means is a transparency.

7. The method of claim 6 wherein the ultraviolet radiation of the step of applying ultraviolet radiation is of sufficient intensity and the transparency in the step of modulating the energy is sufficiently ultraviolet transmissive in its light regions that the linear phosphor is saturated while the nonlinear phosphor increases in intensity.

8. The method of claim 7 wherein the phosphors emit different colors.

9. The method of claim 7 wherein the linear phosphor is aluminum oxide and the nonlinear phosphor is zinc sulfide.

10. A device for viewing photographic transparencies comprising ultraviolet energy means, a screen comprised of a mixture of phosphors which emit different hues as a function of the amount of ultraviolet energy falling thereon, and means for interposing a photographic transparency between said ultraviolet energy means and said screen, said photographic transparency having different ultraviolet transmission in different areas.

11. The device as defined in claim 10 wherein the phosphors are in admixture and are luminescent under the influence of ultraviolet radiation and wherein at least one of said phosphors of said mixture possesses nonlinear phosphor excitation-brightness characteristics.

12. The device as defined in claim 10 wherein said mixture of phosphors includes aluminum oxide phosphor and zinc sulfide.

13. The device as defined in claim 12 wherein said aluminum oxide and zinc sulfide are in a composition of one to four parts by weight of aluminum oxide and approximately one part of zinc sulfide.